US011037216B2

(12) United States Patent
O'Mahony et al.

(10) Patent No.: US 11,037,216 B2
(45) Date of Patent: Jun. 15, 2021

(54) MULTI-MERCHANT PORTAL FOR E-COMMERCE

(71) Applicant: Mastercard International Incorporated, Purchase, NY (US)

(72) Inventors: Chris O'Mahony, Greystones (IE); Stephen Elder, Dublin (IE); Bryan O'Sullivan, Kilcolle (IE); Derek Humphreys, Dublin (IE); Alex Staveley, Dublin (IE); Eammon Doyle, Dublin (IE); Stephen Toner, Dublin (IE); Andrea Rizzini, Dublin (IE); Maurice O'Connor, Dublin (IE); Oran Cummins, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 500 days.

(21) Appl. No.: 15/836,625

(22) Filed: Dec. 8, 2017

(65) Prior Publication Data

US 2018/0165735 A1 Jun. 14, 2018

(30) Foreign Application Priority Data

Dec. 8, 2016 (EP) ..................................... 16203052

(51) Int. Cl.
*G06Q 30/06* (2012.01)
*G06Q 20/32* (2012.01)
*H04L 29/08* (2006.01)

(52) U.S. Cl.
CPC ....... *G06Q 30/0613* (2013.01); *G06Q 20/322* (2013.01); *G06Q 30/0641* (2013.01); *H04L 67/02* (2013.01)

(58) Field of Classification Search
CPC ............. G06Q 30/0613; G06Q 20/322; G06Q 30/0641; H04L 67/02

(Continued)

(56) References Cited

U.S. PATENT DOCUMENTS 5,987,453 A * 11/1999 Krishna ............ G06F 16/24561
2008/0195465 A1 8/2008 Redmond et al.
(Continued)

OTHER PUBLICATIONS

Marthe, M., and Hemalatha Diwakar, "The architecture of a one-stop web-window shop.", (2001), Proceedings Third International Workshop on Advanced Issues of E-Commerce and Web-Based Information Systems. WECWIS 2001. IEEE, 2001, pp. 31-40 (Year: 2001).*

(Continued)

*Primary Examiner* — Resha Desai
*Assistant Examiner* — Elisa H Yang
(74) *Attorney, Agent, or Firm* — Hovey Williams LLP (57) ABSTRACT

A multi-merchant portal that enables a user to access e-commerce stores is provided. Each e-commerce store has respective merchant categories browsable by the user at a customer device through the portal, each merchant category comprising products available for purchase from a respective merchant. In response to receiving a request from the customer device to switch access of the user browsing a selected merchant category of the first merchant in a first e-commerce store, to a second e-commerce store, the portal determines a system category corresponding to the selected merchant category using mapping data mapping merchant categories to system categories and then determines a destination merchant category of the second merchant in the second e-commerce store corresponding to the determined system category using mapping data mapping the system categories to the merchant categories. The portal switches user's access to the destination merchant category in the second e-commerce store.

15 Claims, 7 Drawing Sheets

(58) Field of Classification Search
USPC .................................................. 705/26.41
See application file for complete search history.

(56) References Cited

U.S. PATENT DOCUMENTS

2012/0078731 A1* 3/2012 Linevsky ........... G06Q 30/0277
705/14.73
2016/0232515 A1 8/2016 Jhas et al.

OTHER PUBLICATIONS

PCT Search Report from PCT Application No. PCT/US17/63560 entitled Multi-Merchant Portal for E-Commerce (dated Feb. 23, 2018).
European Search Report from European Patent Application No. 16203052.2 entitled Multi-Merchant Portal for E-Commerce (dated Feb. 13, 2017).
MySQL Pivot Table for Miltilingual Dictionary—Stack Overflow Jul. 20, 2016, Retrieved from the Internet: URL:http://stackoverflow.com/questions/38484583/mysql-pivot-table-for-multilingual-dictional (printed Feb. 3, 2017).

* cited by examiner

| Merchant | Merchant Category | System Category |
|---|---|---|
| Merchant 1 | Beverages | Drink |
| Merchant 1 | Fruit snacks | Snacks |
| Merchant 1 | Snacks | Snacks |
| Merchant 2 | Refreshments | Drink |
| Merchant 2 | Candy Snacks | Snacks |
| Merchant 2 | Snacks | Snacks |
| Merchant 3 | Drinks | Drink |
| Merchant 3 | Light Meals | Snacks |
| Merchant 4 | Liquids | Drink |
| Merchant 4 | Small meals | Snacks |
| Merchant 5 | Drink | Drink |
| Merchant 5 | Snacks | Snacks |

MULTI-MERCHANT PORTAL FOR E-COMMERCE

CROSS-REFERENCE TO RELATED APPLICATIONS

This application claims the priority benefit of European Application No. 16203052.2, filed Dec. 8, 2016, which is incorporated herein by reference in its entirety.

FIELD OF THE INVENTION

This disclosure relates generally to enabling multi-vendor e-commerce marketplace platforms. In particular, but not exclusively, the disclosure relates to a multi-merchant portal that hosts a plurality of e-commerce stores and enables its users to browse at customer devices for a particular product or product category at a first e-commerce store and then to switch to a second e-commerce store, directly accessing a similar or equivalent product category at the second e-commerce store, without having to search for such a product category or traverse product categories of the second e-commerce store.

BACKGROUND OF THE INVENTION

E-commerce (also known as an electronic commerce) generally encompasses the selling and buying of goods and services and the transmission of data and funds by consumers and businesses over the Internet and other electronic networks.

E-commerce contributes substantially to and affects economies of many countries around the world. The e-commerce market continues to grow as people and businesses become more accustomed to conducting transactions online and discover benefits of e-commerce, such as around-the-clock and speedy access and the wide availability of goods and services for consumers with easy accessibility and international reach. For example, the U.S. Commerce Department reports that online sales accounted for more than a third of total U.S. retail sales growth in 2015, while the U.S. Census Bureau reports that e-commerce accounts for 7.5% of all retail sales in the U.S. during the fourth quarter of 2015.

Multi-vendor marketplace is a growing sector of the e-commerce market. A traditional multi-vendor marketplace is an online platform that allows multiple merchants to sign-up for service in order to sell their products through the platform. Each such merchant (or vendor) forms at that marketplace an e-commerce store where its products are launched. The owner of the multi-vendor platform is responsible for logistics of maintaining and providing technical support to the merchants of the multi-vendor marketplace. Amazon, eBay, and Etsy are well-known providers of multi-vendor marketplace platforms.

Some providers provide additional services and/or benefits to the customers of the marketplace, e.g., price comparison between multiple e-commerce stores associated with the marketplace, and/or focus on a particular type of merchants, e.g., grocery stores. These providers commonly aim to serve as a one-stop shop for (portal to) a number of merchants supported by the marketplace, allowing their customers to browse and switch between the respective e-commerce stores. To approximate customer's experience of shopping directly at a particular merchant, when implementing a corresponding e-commerce store, a structure of that merchant's web site may be substantially replicated, for example by using a product categorisation scheme (or model) of that merchant.

In this manner, a user browsing the e-commerce store through the multi-vendor marketplace enjoys a familiar environment. Therefore, it is easier for the user to locate a specific product or category in the e-commerce store hosted by the multi-vendor marketplace.

Once that product or category has been located, the user may wish to switch to another e-commerce store of the multi-vendor marketplace, for example to compare the prices on the same or similar products at different e-commerce stores. In this scenario, however, the user of the multi-vendor marketplace is often required to start his or her search for such a product at the top level of the hierarchy of the categorisation scheme of the other e-commerce store, e.g., a home page, because the categorisations schemes are not shared across the e-commerce stores and often differ due to different merchants using different product categorisation schemes.

Thus, in order to maintain a "native" product categorisation scheme at each of the e-commerce sites, the multi-vendor marketplace puts a burden on the user to find desired products when switching to a new e-commerce site. The users are required to spend additional time browsing and searching for desired products and/or to compare prices. Even if the user decides to return to the e-commerce store where he or she started (e.g., because that e-commerce provided a better price), the search for the product or product category needs to be performed once again.

Such browsing and searching consumes network and marketplace resources as well as increases time necessary to complete a purchase. Therefore, this conventional approach to enabling browsing and switching between e-commerce stores at a multi-vendor marketplace suffers from inefficient use of network and marketplace resources and is burdensome on the users of the multi-vendor marketplace.

SUMMARY OF INVENTION

The present disclosure provides a multi-merchant portal that supports (hosts) a plurality of e-commerce stores with native categorisation schemes of their respective merchants respectively and associated methods and systems. The methods described herein are convenient and resource and time-efficient and enable a user browsing a particular category or product at one e-commerce store to directly switch to an equivalent or similar category or product at another e-commerce store.

Additionally, mapping schemes for mapping categories of different e-commerce stores that employed by the multi-merchant portal are disclosed. These mapping schemes improve performance of the multi-merchant portal, enable easy detection of mapping errors, and/or are scalable, reducing costs and resources associated with adding a new e-commerce store to the multi-merchant portal.

More specifically, according to one aspect, there is provided a computer-implemented method of running by a server a multi-merchant portal enabling a user to shop at a plurality of e-commerce stores respectively associated with a plurality of merchants using a customer device. The method comprises: receiving by the server a request from the customer device to switch access of the user accessing a selected merchant category in a first of the plurality of e-commerce stores to a second of the plurality of e-commerce stores, wherein: the first e-commerce store comprises a plurality of merchant categories of a first merchant including one or more products available for purchase from the first merchant and browsable by the user at the customer device through the multi-merchant portal, and the second e-commerce store comprises a plurality of merchant categories of a second merchant including one or more products available for purchase from the second merchant and browsable by the user at the customer device through the multi-merchant portal. The method further comprises: determining by the server a system category corresponding to the selected merchant category of the first merchant using merchant-to-system mapping data mapping merchant categories of the plurality of merchants to a plurality of system categories of the multi-merchant portal; determining by the server a destination of the plurality of merchant categories of the second merchant using system-to-merchant mapping data mapping the plurality of system categories to the merchant categories; and switching by the server access of the user at the multi-merchant portal from the selected merchant category in the first e-commerce store to the destination merchant category in the second e-commerce store in response to the request from the customer device to switch to the second e-commerce store.

In this manner, the "native" categorisation schemes of the merchants can be retained, while the user is enabled to switch between equivalent or similar merchant categories of different merchants directly, without having to search for such categories.

Further, the use of system categories as a pivot to map merchant categories between the different merchants ensures scalability of the mapping data, with the mapping data being easily expandable in response to addition of a new e-commerce store.

In some example embodiments, the selected merchant category of the first merchant and the destination merchant category of the second merchant have different designations.

Thus, even if different merchants use different designations for their directories, equivalent or similar merchant categories can be determined and matched.

In some example embodiments, the method further comprises: enabling the user to browse the second e-commerce store.

Thus, once the user is switched to the new e-commerce store, the user is able to browse that e-commerce store as if he or she would have started at the home page of that e-commerce store.

In some example embodiments, for each of the plurality of merchants: the merchant-to-system mapping data maps each merchant category of the merchant to one of the plurality of system categories of the multi-merchant portal; and the system-to-merchant mapping data maps each of the plurality of system categories of the multi-merchant portal to a single merchant category of the merchant.

Mapping merchant categories in this manner advantageously allows for both symmetrical and asymmetrical mapping approaches, therefore enabling complex mappings.

In some example embodiments, at least one of the plurality of merchants has two or more merchant categories mapped by the merchant-to-system mapping data to a same system category of the multi-merchant portal, thereby the merchant-to-system mapping data and system-to-merchant mapping data defining an asymmetrical relation between the two or more merchant categories of the at least one merchant and the same system category.

In some example embodiments, the system category of the multi-merchant portal corresponding to the selected merchant category of the first merchant has a higher hierarchy level in the plurality of system categories than the selected merchant category in the plurality of merchant categories in the first merchant.

In some example embodiments, the destination merchant category of the second merchant has a higher hierarchy level in the plurality of merchant categories of the second merchant than the system category of the multi-merchant portal corresponding to the selected merchant category of the first merchant in the plurality of system categories.

Such asymmetrical mappings allow the multi-merchant portal to ensure that appropriate match is provided between merchant categories of different merchants even when there is no match available on the same hierarchy level in the respective categorisation schemes of the merchants.

In some example embodiments, the merchant-to-system mapping data is a first two-dimensional relational table and the system-to-merchant mapping data is a second two-dimensional relational table.

Arranging the mapping data as two-dimensional relational tables provides for easy and efficient access to the mapping data, with minimal indexing to be performed for such search and access, as well as ensures easy update of the mapping data such as when a new merchant is introduced, without disturbing existing mapping data.

Furthermore, using two-dimensional relational tables for the mapping data ensures easy detection of bad mappings or if a mapping is missing.

In some example embodiment, the steps of determining the system category corresponding to the selected merchant category of the first merchant and determining the destination merchant category of the second merchant are performed by executing a single join query on the first and second two-dimensional relational tables.

In this manner, efficient and fast search for and retrieval of the relevant merchant category in the new merchant store is advantageously provided.

In some example embodiments, the method further comprises: receiving by the server a request from the customer device to switch access of the user accessing a selected merchant category in the second e-commerce store to a third of the plurality of e-commerce stores, wherein the third e-commerce store comprises a plurality of merchant categories of a third merchant including one or more products available for purchase from the third merchant and browsable by the user at the customer device through the multi-merchant portal; determining by the server a system category corresponding to the selected merchant category of the second merchant using the merchant-to-system mapping data; determining by the server a destination of the plurality of merchant categories of the third merchant using the system-to-merchant mapping data; and switching by the server access of the user at the multi-merchant portal from the selected merchant category in the second e-commerce store to the destination merchant category in the third e-commerce store in response to the request from the customer device to switch to the third e-commerce store.

Therefore, the multi-merchant portal advantageously enables the user to continue changing (switching) an e-commerce store(s), jumping between equivalent or similar categories of all e-commerce stores hosted by the multi-merchant portal.

In some example embodiments, the third e-commerce store is the first e-commerce store.

Therefore, the multi-merchant portal advantageously enables the user to switch back and forth between equivalent or similar merchant categories of two e-commerce stores.

In some example embodiments, the destination merchant category of the third merchant is different from the selected merchant category of the first merchant.

Therefore, the multi-merchant portal enables appropriate match between merchant categories of different merchants even when there is no match available on the same hierarchy level in the respective categorisation schemes of the merchants.

In some example embodiments, the method further comprises: receiving through the multi-merchant portal data concerning one or more products selected by the user for purchase at one of the plurality of e-commerce stores; and initiating by the server a payment transaction to complete the purchase of the selected one or more products.

In some example embodiments, the multi-merchant portal is a web portal.

In some example embodiment, the customer device is comprised in one of a smart refrigerator or a mobile device.

According to another aspect, a server is provided, the server comprising a first memory having instructions stored thereon; a second memory having the merchant-to-system mapping data and the system-to-merchant mapping data stored thereon; and one or more processors configured when executing the instructions stored in the first memory to perform the method of any of the preceding claims to perform any of the methods described above.

BRIEF DESCRIPTION OF THE DRAWINGS

Embodiments of the present invention will be described, by way of example only, with reference to the accompanying drawings, in which.

DETAILED DESCRIPTION

The present disclosure provides for a multi-merchant portal and associated methods and systems that enable a user to access and browse e-commerce stores hosted by the multi-merchant portal. Each e-commerce store has respective merchant categories browsable by the user at the customer device through the multi-merchant portal and each merchant category includes products available for purchase from a respective merchant. In response to receiving a request from the customer device to switch access of the user browsing a selected merchant category of the one merchant in one of e-commerce stores to another e-commerce store, the multi-merchant portal described herein is able determine an equivalent or similar merchant category in the latter e-commerce store and switch user's access accordingly.

The determination of the equivalent or similar merchant category is effected with reference to mapping data of the multi-merchant portal. As described hereinafter in greater detail, the mapping data is designed to incorporate system categories defined for the multi-merchant portal and uses them as a pivot for matching merchant categories of different e-commerce stores. Further, the mapping data may also be subject to a number of designs rules to ensure the most appropriate matches between merchant categories are found and the mapping is executed efficiently.

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, combinations, and equivalents.

In the following description, numerous specific details are set forth in order to provide a thorough understanding of the various embodiments. However, the present invention may be practiced without some or all of these specific details. Further, well known process operations have not been described in detail in order to not unnecessarily obscure the present disclosure. Furthermore, each appearance of the phrase "example embodiment(s)," "illustrative embodiment(s)," "some embodiments" at various places in the specification does not necessarily refer to the same or different example(s) or illustrative embodiment(s), unless expressly specified.

Figure 1:
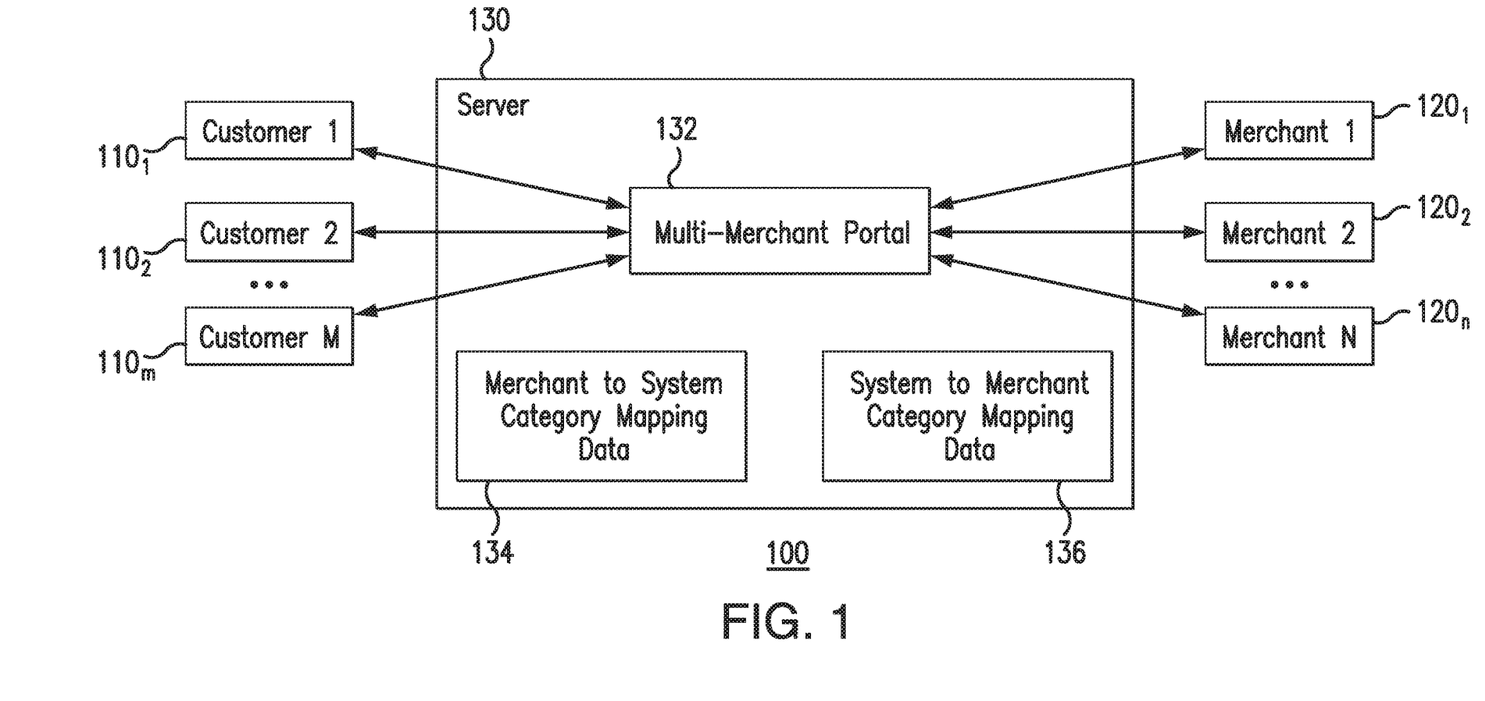
FIG. 1 is a block diagram of a system that enables customers to browse through and make purchases at merchants through a multi-merchant portal supporting e-commerce stores associated with the merchants, in accordance with some embodiments of the present invention.

FIG. 1 is a block diagram of a system that enables customers to browse and make purchases at merchants through a multi-merchant portal hosting e-commerce stores for the merchants, according to some embodiments of the present invention.

More specifically, FIG. 1 depicts a system 100 that includes a server 130 with a multi-merchant portal 132 implemented thereon. The multi-merchant portal 132 hosts e-commerce stores (not shown) for each of merchants $120_1$, $120_2 \ldots 120_n$ respectively and enables its users to browse such e-commerce stores at their customer devices, select products for purchase, and complete the purchase through the multi-merchant portal 132. The multi-merchant portal 132 can handle the latter stage on behalf of the e-commerce store or, once the user finalises the order, transmit the order data to the respective merchant for processing and completion. Implementation of the latter stage may vary between different e-commerce stores of the multi-merchant portal and depends on particular circumstances of the associated merchant, for example, on its technical capabilities or, simply, preference.

Each e-commerce store maintains a native categorisation scheme of the respective (associated) merchant as well as description of products available for purchase at that merchant. Data that enables re-creation of the categorisation scheme in the e-commerce store is obtained by the multi-merchant portal 132 using APIs of the merchants $120_1$, $120_2 \ldots 120_n$ and stored at the server 130. More specifically, the multi-merchant portal 132 sends API requests to the merchants $120_1$, $120_2 \ldots 120_n$ and in response receives API data that enables the multi-merchant portal 132 to reproduce the categorisation scheme of the merchants at their respective e-commerce stores along with the descriptions of the products available for purchase at each respective merchant.

Therefore, a user of the multi-merchant portal 132 (e.g., via a customer device $110_1$, $110_2$ . . . or $110_m$), whilst accessing the multi-merchant portal 132, is enabled to shop at each of the associated merchants $120_1$, $120_2$, . . . $120_n$ as she or he would shop at that merchant directly. The multi-merchant portal 132 enables the user to browse product categories (also referred as merchant categories) and search for a particular product or category at the customer device.

The multi-merchant portal 132 also enables the user the switch between different e-commerce stores. As discussed with reference to FIGS. 2 to 7 in greater detail, methods and techniques disclosed herein enable the user to browse or search for a particular product (item) or category at one e-commerce store and then select to switch to another e-commerce store to access directly an equivalent or similar category. Using an analogy of a shopper in a supermarket, the shopper standing in one aisle of the supermarket looking at dairy products by a press of a button is transported to a "dairy" aisle in another supermarket and able to view the "dairy" products there.

To enable the user to switch between similar or equivalent categories of different e-commerce stores, the multi-merchant portal 132 has an internal categorisation scheme consisting of a plurality of system categories and employs the merchant-to-system category mapping data 134 and the system-to-merchant category data 136 stored at the server 130 to define relations between the system categories and the merchant categories and back.

In particular, the merchant-to-system category mapping data 134 maps the merchant categories of the merchants $120_1$, $120_2$ . . . $120_n$ to the system categories of the multi-merchant portal 132. The system-to-merchant category mapping data 136 maps the system categories of the multi-merchant portal 132 to the merchant categories of the merchants $120_1$, $120_2$ . . . $120n$.

Once a customer device of the user accessing a first e-commerce store requests on behalf of the user to access a second e-commerce store, the multi-merchant portal 132 determines a system category corresponding to the category currently accessed by the user at the first e-commerce store, using the mapping data 136, and then determines a merchant category of the second e-commerce store corresponding to the determined system category. In this manner, an equivalent or substantially similar category is determined in the second e-commerce store and the user is provided with access to such a category directly, without having to browse or search the second e-commerce store.

Therefore, the system categories serve as a pivot in mappings between merchant categories of different e-commerce stores. The system categories do not belong to any of the merchants and are created as a part of the system architecture of the server 130 to guide mappings between the merchant categories of different merchants. The pivoting structure for mapping of the merchant categories via the internal system categories ensures scalability of the mapping data of the multi-merchant portal 132. For example, when a new e-commerce store is added to the multi-merchant portal for a new merchant, the mapping data can easily be updated without affecting any of the existing mapping data. In particular, only data mapping from/to the merchant categories of the new merchant to/from the system categories need to be introduced.

Similarly, if a particular merchant has updated its categorisation scheme, only mapping data related to the merchant categories that have been updated requires an update. The mapping data of the other merchants and of the merchant categories that were not subject of the update to the categorisation scheme is not affected. The process of generating and updating the mapping data is manual and completed for each merchant after analysis of that merchant's categorisation scheme in relation to the multi-merchant portal's categorisation scheme.

To ensure consistent and reliable mapping, in some example embodiments, the merchant-to-system mapping data 134 maps each merchant category of each of the merchants $120_1$, $120_2$ . . . $120_n$ to a respective system category of the multi-merchant portal, whilst the system-to-merchant mapping data 136 maps each system category of the multi-merchant portal to a single merchant category of each merchant. More specifically, the merchant-to-system mapping data 134 includes all merchant categories of each of the merchants $120_1$, $120_2$ . . . $120_n$. Each such merchant category is mapped to one of the system categories. The system-to-merchant mapping data includes all system categories. Each system category is mapped to one, and only one, merchant category for every merchant $120_1$, $120_2$ . . . $120_n$.

This mapping arrangement allows both symmetrical and asymmetrical mappings between the merchant categories and the system categories. In particular, the system-to-merchant mapping data 136 does not necessarily need to include all merchant categories for all the merchants $120_1$, $120_2$ . . . $120_n$ and/or several merchant categories of a particular merchant may be mapped to the same system category in the merchant-to-system mapping data 134. The benefits of asymmetrical mappings are discussed with reference to FIGS. 2 to 7, particularly with reference to FIG. 4.

Figure 2:
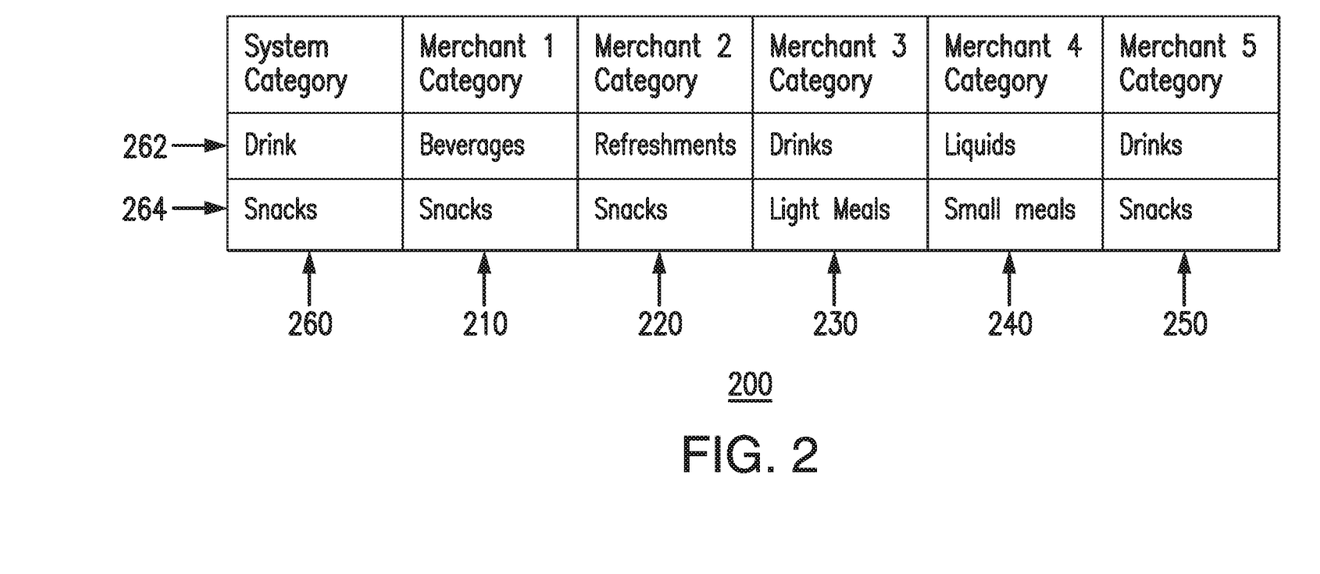
FIG. 2 shows a table mapping system categories of a multi-merchant portal to merchant categories of a plurality of different merchants, in accordance with some embodiments of the present invention.
Figure 3:
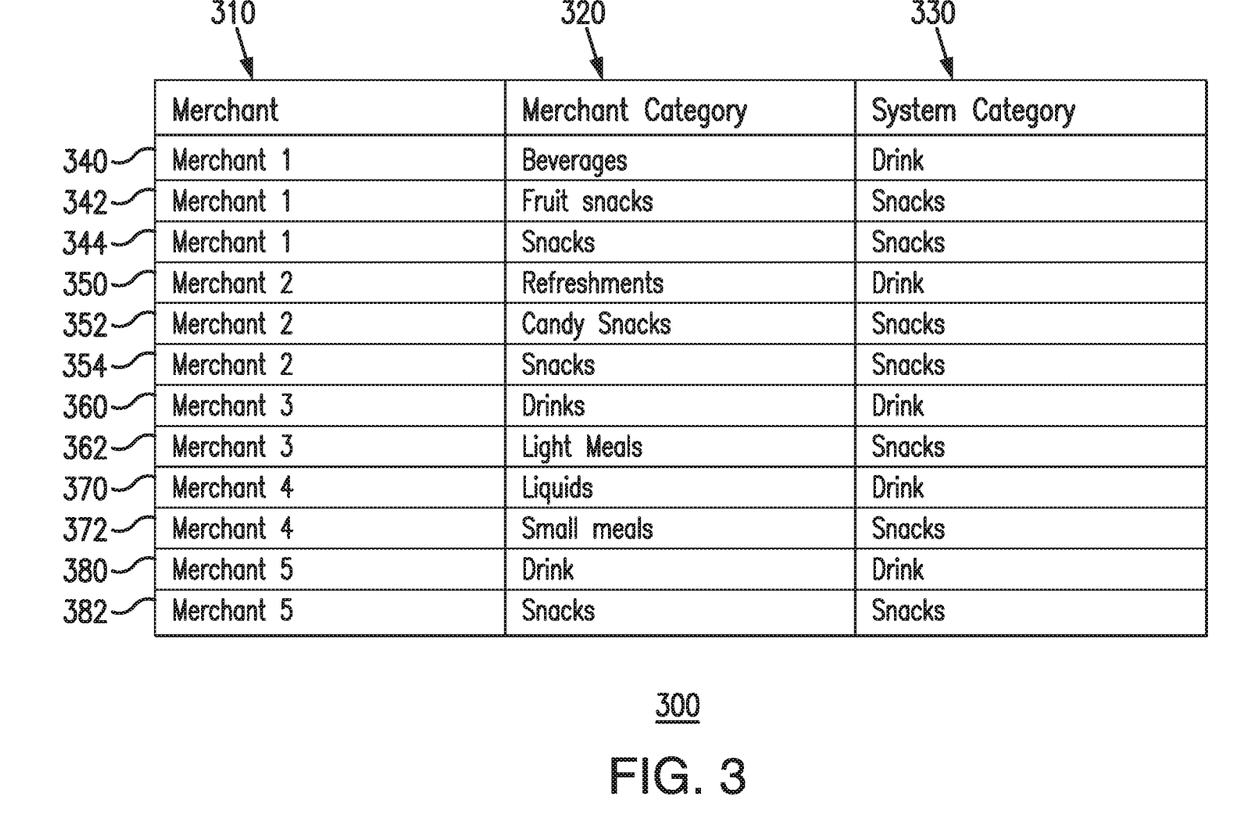
FIG. 3 shows a table mapping merchant categories of a plurality of different merchants to system categories of a multi-merchant portal, in accordance with some embodiments of the present invention.

In some example embodiments, the merchant-to-system mapping data 134 and the system-to-merchant mapping data 136 are implemented as two two-dimensional (2D) relational tables, where the first table stores mappings from the merchant categories to the system categories and the second table stores mappings from the system categories to the merchant categories. FIGS. 2 and 3 show examples of such tables for a specific scenario.

More specifically, FIG. 2 shows a 2D relational table 200 mapping the system categories of the multi-merchant portal to the merchant categories of five merchants.

The table 200 has six columns: one column—column 260—for the system categories and five columns—210, 220, 230, 240, and 250—for the merchant categories, one column for each merchant. This means that in the table of this type the number of columns is one more than the number of the merchants.

The table 200 has two rows 262 and 264 for mapping the system categories to specific merchant categories of each of the five merchants. More generally, the table 200 includes one row for each system category defined in the multi-merchant portal. This means that in the table of this type the number of rows is the same as the number of the system categories.

FIG. 3 shows a 2D relational table 300 mapping the merchant categories of the five merchants of FIG. 2 to the system categories of FIG. 2.

The table 300 has three columns: column 310 listing merchants' identifiers, column 320 listing all merchant categories, and column 330, listing the system categories. The number of rows corresponds to the total number of merchant categories for all merchants (here twelve).

In the table 300, the first merchant is shown to have three merchant categories, i.e., 'Beverages', 'Fruit Snacks', and 'Snacks'. Each such merchant category is allocated one row, i.e., rows 340, 342, and 344. The second merchant is also shown to have three merchant categories, i.e., 'Refreshments', 'Candy Snacks', and 'Snacks'. Similarly, each such merchant category is allocated one row, i.e., rows 350, 352, and 354.

The third, fourth, and fifth merchants are shown to have two merchant categories each, 'Drinks' and 'Light Meals', 'Liquids' and 'Small Meals', and 'Drink' and 'Snacks' respectively. Therefore, these three merchants are allocated two rows each, i.e., 360 and 362, 370 and 372, and 380 and 382 respectively.

The mappings provided by the tables 200 and 300 enable the multi-merchant portal to allow its users to browse across merchant categories of different merchants, jumping between similar or equivalent categories of different merchants. When a user is any of the merchant categories of a first merchant, the multi-merchant portal is able to map that merchant category to an equivalent or the most similar category of any other merchant by navigating across the mapping tables 200 and 300.

For example, if a user is in the 'Snacks' category of the e-commerce store of Merchant 1 and wishes to switch to the e-commerce store of Merchant 2, the multi-merchant portal is able to determine the equivalent or most similar merchant category of Merchant 2 with reference to the tables 200 and 300. More specifically, with reference to the table 300, the multi-merchant portal is able to map the Merchant 1 category 'Snacks' to the system category 'Snacks'. This mapping can be seen in the row 344 of the table 300. Then, with reference to the table 200, the multi-merchant portal is able to map the system category 'Snacks' to the Merchant 2 category 'Snacks'. This mapping can be seen in the row 264 of the table 200. Therefore, in response to the user's request to switch to the Merchant 2 e-commerce store, received when the user is in the category 'Snacks' of the Merchant 1 e-commerce store, the multi-merchant portal is able to provide the user with access to the 'Snacks' category of Merchant 2.

Similarly, if the user is in the 'Refreshments' category of the e-commerce store of Merchant 2 and wishes to switch to the e-commerce store of Merchant 4, with reference to the table 300, the multi-merchant portal is able to map the Merchant 2 category 'Refreshments' to the system category 'Drink'. This mapping can be seen in the row 350 of the table 300. Then, with reference to the table 200, the multi-merchant portal is able to map the system category 'Drink' to the Merchant 4 category 'Liquid'. This mapping can be seen in the row 262 of the table 200. Therefore, in response to the user's request to switch to the Merchant 4 e-commerce store, received when the user is in the category 'Refreshments' of the Merchant 2 e-commerce store, the multi-merchant portal is able to provide the user with access to the 'Liquids' category of Merchant 4.

In some embodiments, to determine the system category corresponding to the merchant category of the originating e-commerce store (e.g., the Merchant 1 category 'Snacks' and the Merchant 2 category 'Refreshments' in the above-discussed two examples) and to determine the merchant category of the destination e-commerce store (e.g., the Merchant 2 category 'Snacks' and the Merchant 4 category 'Liquids' in the above-discussed two examples), the multi-merchant portal executes a single query on its mapping data, such as the merchant-to-system mapping data 134 and the system-to-merchant mapping data 136 discussed with reference to FIG. 1 and the tables 200 and 300 shown in FIGS. 2 and 3. Such a single query can, for example be, an SQL database join query.

Thus, in the context of the first example discussed above—switching from the e-commerce store Merchant 1 to the e-commerce store Merchant 2—an exemplary SQL database join query run on the tables 200 and 300 to determine the Merchant 2 category 'Snacks' can be written as follows:

```
SELECT MERCHANT2_CATEGORY FROM
SYSTEM_CATEGORY_MAPPINGS WHERE
SYSTEM_CATEGORY IN (SELECT SYSTEM_CATEGORY FROM
MERCHANT_CATEGORY_MAPPINGS WHERE MERCHANT1
CATEGORY = 'Snacks')
```

In the context of the second example discussed above—switching from the e-commerce store of Merchant 2 to the e-commerce store of Merchant 4, an exemplary SQL database join query run on the tables 200 and 300 to determine the Merchant 4 category 'Liquids' can be written as follows:

```
SELECT MERCHANT24_CATEGORY FROM
SYSTEM_CATEGORY_MAPPINGS WHERE
SYSTEM_CATEGORY IN
(SELECT SYSTEM_CATEGORY FROM
MERCHANT_CATEGORY_MAPPINGS WHERE MERCHANT2
CATEGORY = 'Refreshments')
```

The above-described mapping arrangements allow for both symmetrical and asymmetrical mapping between the merchant categories and the system categories.

For example, as shown in the rows 342 and 344 of the table 300, Merchant 1 has two related merchant categories 'Fruit Snacks' and 'Snacks'. The 'Fruit Snacks' category is a sub-category of the category 'Snacks'. The table 300 maps these two categories to the same system category 'Snacks'. At the same time, the table 200 maps the system category 'Snacks' to the Merchant 2 category 'Snacks'. The table 200 however does not include the Merchant 2 category 'Fruit Snacks'.

Therefore, if the user is in the Merchant 1 category 'Fruit Snacks,' when switching to the e-commerce store of Merchant 2, the system category 'Snacks' will pivot the user into the Merchant 2 category 'Snacks'. However, if the user then decides to go back to the e-commerce store of Merchant 1, while in the Merchant 2 category 'Snacks,' the system category 'Snacks' will pivot the user into the Merchant 1 category 'Snacks,' which is the better match than the Merchant 1 category 'Fruit Snacks'.

Such asymmetrical mappings using the system categories as a pivot enable complex mapping, allowing the multi-merchant portal to achieve better matches between merchant categories of different e-commerce stores.

In some example embodiments, the asymmetrical mapping approach is further expanded to avoid bad or inconsistent mappings. For example, as shown in the table 300, Merchant 1 has the merchant category 'Fruit snacks,' which is the sub-category of the Merchant 1 category 'Snacks'. Merchant 2 has the merchant category 'Candy snacks,' which is the sub-category of the Merchant 2 category 'Snacks'. Although both sub-categories are sub-categories of the equivalent merchant categories 'Snack,' mapping of the 'Fruit Snacks' category to the 'Candy Snacks' category or the 'Candy Snacks' category to the 'Fruit Snacks' category is inconsistent as these sub-categories include different types of products—fruit versus candy.

To avoid such bad mappings, in some embodiments, the mapping data of the multi-merchant portal, such as the merchant-to-system mapping data 134 and the system-to-merchant mapping data 136, is subject of the following two design rules:
  (1) In the mapping data mapping the merchant categories to the system categories, such as the table 300, the system category must always be at the same level of hierarchy or a higher level of hierarchy than the corresponding merchant category; and
  (2) In the mapping data mapping the system categories to the merchant categories, such as the table 200, the merchant category must always be at the same level of hierarchy or a higher level of hierarchy than the corresponding system category.

Therefore, when the user's access is being switched from an originating e-commerce store to a destination e-commerce store, the user is placed in a merchant category of the destination e-commerce store that has either the same or a higher hierarchy level in the categorisation scheme of the destination e-commerce store than the hierarchy level of the respective merchant category in the categorisation scheme of the originating e-commerce store.

Figure 4:
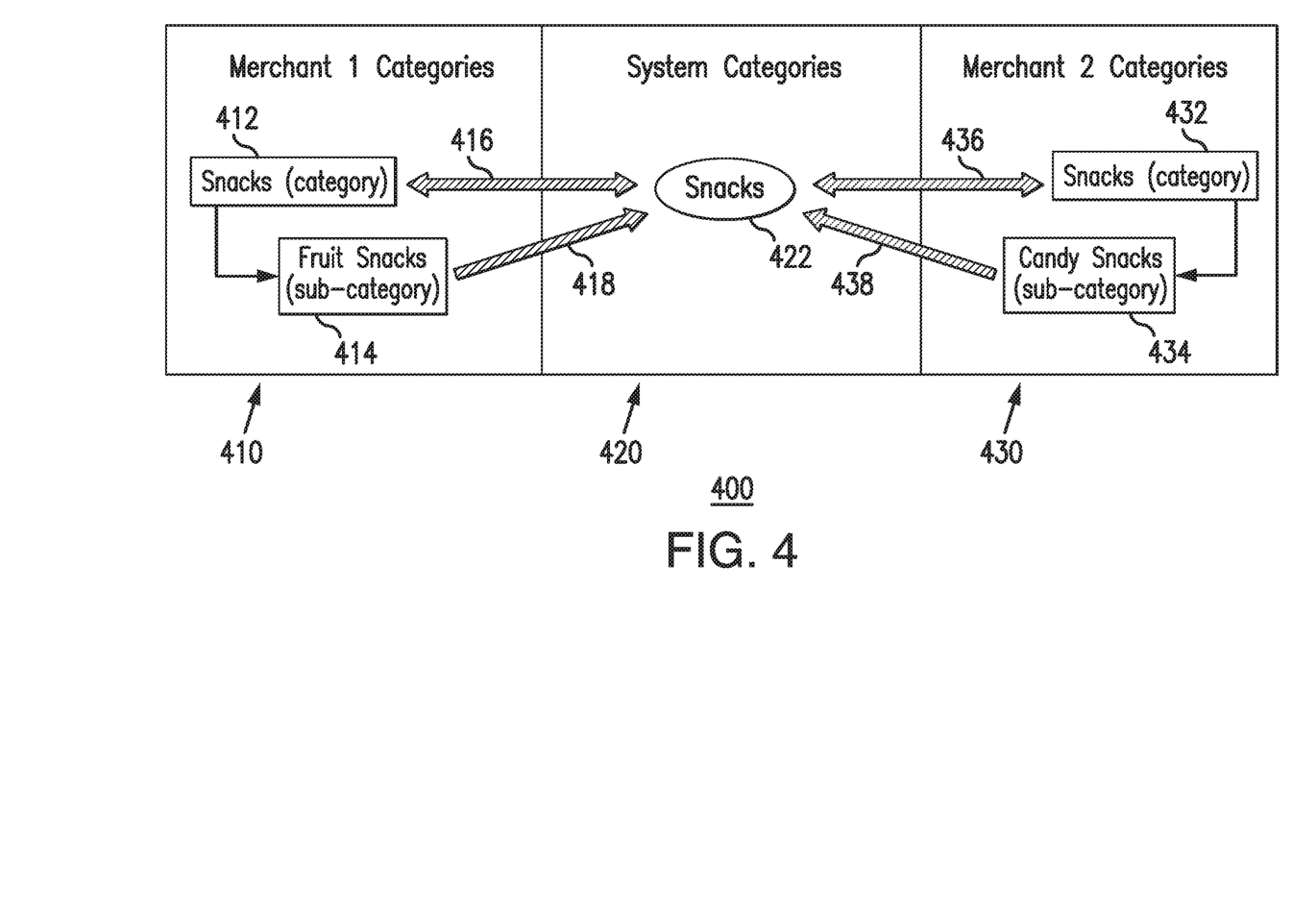
FIG. 4 shows an example of asymmetrical relations between merchant and system categories, in accordance with some embodiments of the present invention.

This principle is depicted in the example of FIG. 4, which shows a diagram 400 of asymmetrical relations between the Merchant 1 categories and the system categories, and the Merchant 2 categories and the system categories in the context of the 'Candy Snacks' and 'Fruit Snacks' example.

More specifically, FIG. 4 shows that the Merchant 1 categories 410 include the 'Snacks' category 412 and the 'Fruit Snacks' sub-category 414, the system categories 420 includes the 'Snacks' category 422, and the Merchant 2 Categories 430 include the 'Snacks' category 432 and the 'Candy Snacks' sub-category 434.

The symmetrical mapping 416 is derived from the mapping (row) 344 in the table 300 that maps the Merchant 1 'Snacks' category to the system 'Snacks' category and the mapping (row) 264 in the table 200 that maps the system 'Snacks' category to the Merchant 1 'Snacks' category. The asymmetrical mapping 418 is derived from the mapping (row) 342 in the table 300 that maps the Merchant 1 'Fruit Snacks' category to the system 'Snacks' category and the lack of reference to the 'Fruit Snacks' category in the table 200.

Similarly, the symmetrical mapping 436 is derived from the mapping (row) 354 in the table 300 that maps the Merchant 2 'Snacks' category to the system 'Snacks' category and the mapping (row) 264 in the table 200 that maps the system 'Snacks' category to the Merchant 2 'Snacks' category. The asymmetrical mapping 438 is derived from the mapping (row) 352 in the table 300 that maps the Merchant 2 'Candy Snacks' category to the system 'Snacks' category and the lack of reference to the 'Candy Snacks' category in the table 200.

Therefore, the multi-merchant portal allows the user to switch between the e-commerce stores of Merchant 1 and Merchant 2, by switching the user's access from the 'Snacks' category of Merchant 1 to the 'Snacks' category of Merchant 2 or back, from the 'Fruit Snacks' category of Merchant 1 to the 'Snack' category of Merchant 2, and from the 'Candy Snacks' category of Merchant 2 to the 'Snack' category of Merchant 1. However, the multi-merchant portal would not switch the user's access between the e-commerce stores of Merchant 1 and Merchant 2 by switching the user's access from the 'Fruit Snacks' category of Merchant 1 to the 'Candy Snacks' category of Merchant 2 or back, from the 'Snacks' category of Merchant 1 to the 'Candy Snacks' category of Merchant 2, or from the 'Snacks' category of Merchant 2 to the 'Fruit Snacks' category of Merchant 1.

Accordingly, the allowed browsing across merchant categories of different e-commerce stores includes moving up the hierarchy level of the merchant category or staying at the same hierarchy lever of the merchant category, but excludes moving down the hierarchy level of the merchant category.

Due to the finite and deterministic nature of the described merchant-to-system and system-to-merchant mappings, particular when implemented in the form of the tables, it is easy to check the mapping data to ensure that that there are no mappings that go from a merchant category having a higher hierarchy level to a merchant category having a lower hierarchy level.

Further, by implementing the following rules to generate the mapping tables, such as the tables 200 and 300, determination of missing mappings becomes easy:
  (1) The number of rows in the system-to-merchant category mapping table must equal the number of the system categories. No cell of the table should have a null value.
  (2) The number of rows in the merchant-to-system category mapping table must equal the total number of merchant categories for all supported merchants. No cell should have a null value.

If either of the above rules is violated, then a category mapping is missing.

Furthermore, using two-dimensional tables to map the merchant and system categories also ensures efficient and time search when an equivalent or similar merchant category is sought. In particular, for the system-to-merchant category, only one column needs to be indexed, i.e., the system category column (e.g., the column 260 in the table 200 of FIG. 2). Similarly, for the merchant-to-system category, only one index is required—a compound index of two columns, i.e., the merchant and the merchant category columns (e.g., the columns 310 and 320 in the table 300 of FIG. 3). No further indexes are required for retrieval of the relevant data, and thus the mapping queries would return requested data fast.

Figure 5:
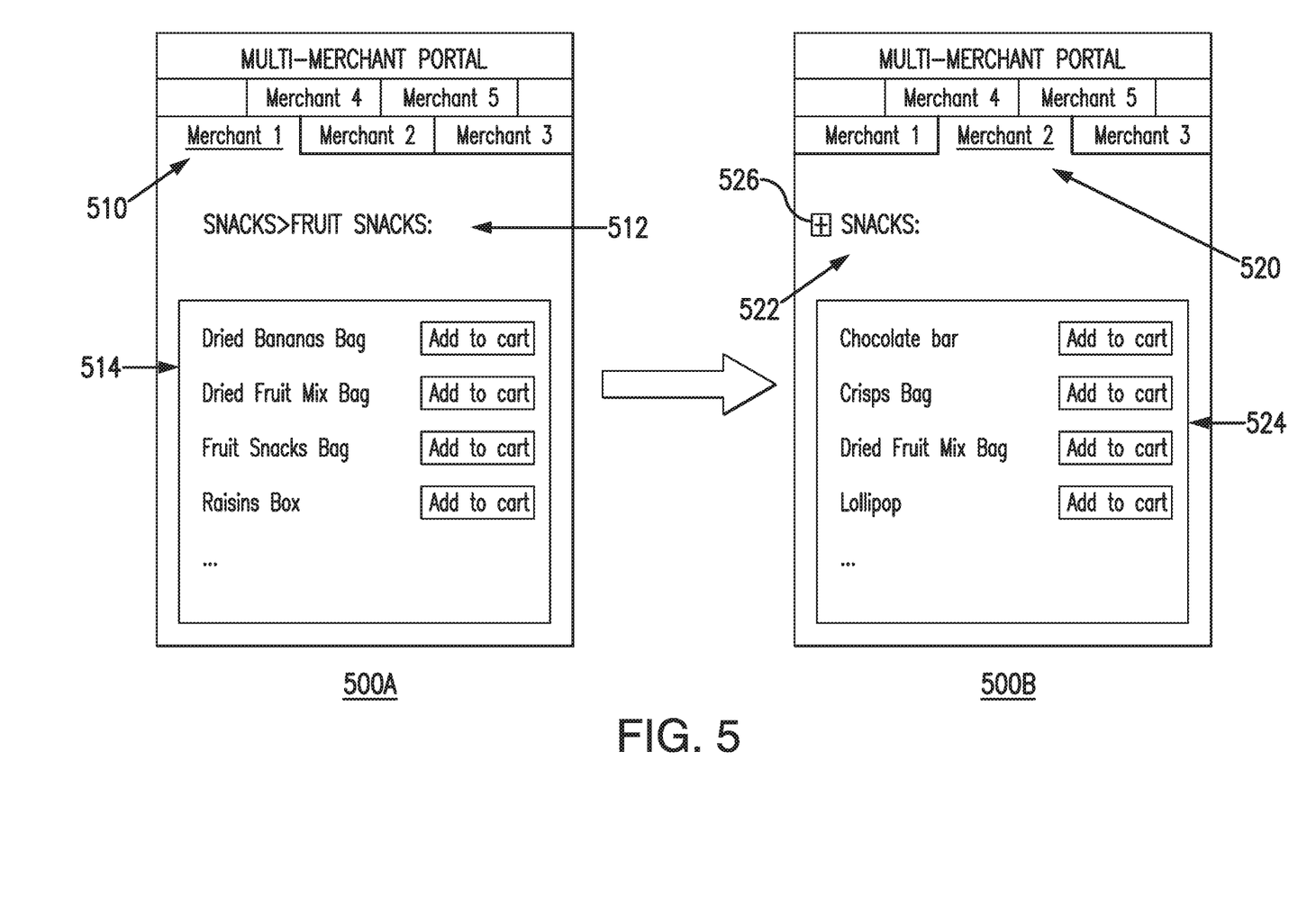
FIGS. 5 and 6 are diagrams depicting examples of a multi-merchant portal graphical user interface, in accordance with some embodiments of the present invention.
Figure 6:
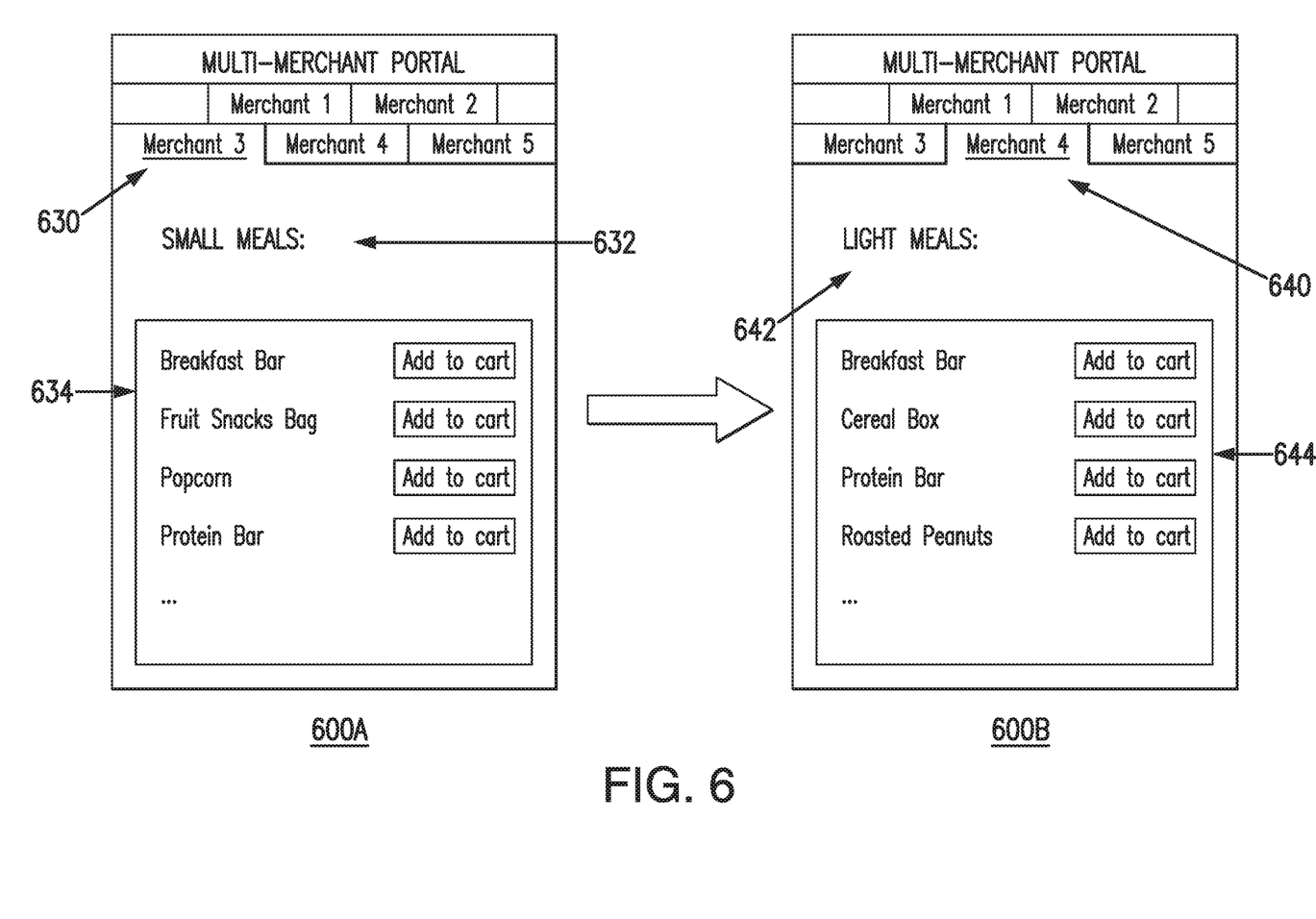

FIGS. 5 and 6 are simplified diagrams of a graphical user interface (GUI) of the multi-merchant portal, in accordance with some embodiments of the present invention. This GUI is accessible and browsable by the user via his or hers customer device, where the customer device detects user's inputs and selections in the GUI and transmits corresponding data towards the server supporting and running the multi-merchant portal.

More specifically, each of FIGS. 5 and 6 shows two simplified GUI screens of the multi-merchant portal—before and after a user requests to switch from one e-commerce store to another e-commerce store. Exemplary scenarios of FIGS. 5 and 6 rely on the mapping data of the tables 200 and 300 described with reference to FIGS. 2 and 3.

The GUI of FIGS. 5 and 6 includes selectable tabs, such as tabs 510, 520, 630, and 640, identifying e-commerce stores available for the user to select and browse, i.e., Merchants 1 to 5. In the GUI screen 500A of FIG. 5, the user browses an e-commerce store of Merchant 1 and is shown accessing the 'Fruit Snacks' sub-category 512. The user is displayed a number of products 514 within the selected 'Fruit Snacks' sub-category that are available for purchase by adding them to a shopping cart.

While in the 'Fruit Snacks' sub-category, the user may decide to switch to the e-commerce store of Merchant 2. To request the switch, the user selects the tab 520 identifying Merchant 2. In response, the multi-merchant portal uses the mapping data, such as the tables 200 and 300, to determine a Merchant 2 category that is equivalent or similar to the 'Fruit Snacks' sub-category of Merchant 1.

In the manner described in detail with reference to FIGS. 2 to 4, the multi-merchant portal determines that the Merchant 1 category 'Fruit Snacks' maps to the system category 'Snacks,' which in turn maps to the Merchant 2 category 'Snacks'. Thus, in response to the user's request to switch to the Merchant 2 e-commerce store, the multi-merchant portal switches the user's access to the Merchant 2 category 'Snacks' 522, as shown in the GUI screen 500B.

The example of FIG. 5 shows how enforcing the above discussed design rules for mapping the merchant and system categories ensures that appropriate matching category is selected: (1) in mappings of merchant categories to system categories, the system category must always be at the same or higher level of hierarchy than the corresponding merchant category; and (2) in mappings of system categories to merchant categories, the merchant category must always be at the same or higher level of hierarchy than the corresponding system category. In particular, as indicated by a sign 526, the Merchant 2 category 'Snacks' is expandable. With reference to the table 300, the Merchant 2 category 'Snacks' has the sub-category 'Candy Snacks.' However, the 'Candy Snacks' category is rather different from the 'Fruit Snacks' category and would not be perceived as similar or equivalent by an average shopper. The higher hierarchy level category, i.e., the Merchant 2 category 'Snacks' is a more suitable match for the 'Fruit Snacks' category than the 'Candy Snacks' sub-category Once the user's access is switched to the Merchant 2 e-commerce store, the user is able to select products available for purchase in the 'Snacks' category by adding them to the shopping cart, select another Merchant 2 category, or request to switch to another e-commerce store.

In the GUI screen 600A of FIG. 6, the user browses an e-commerce store of Merchant 3 and is shown accessing the 'Small Meals' category 632. The user is displayed a number of products 634 within the selected 'Small Meals' category that are available for purchase by adding them to the shopping cart.

While in the 'Small Meals' category, the user may decide to switch to the e-commerce store of Merchant 4. To request the switch, the user selects the Merchant 4 tab 640. In response, the multi-merchant portal uses the mapping data, such as the tables 200 and 300, to determine a Merchant 4 category that is equivalent or similar to the 'Small Meals' category of Merchant 4.

In the manner described in detail with reference to FIGS. 2 to 4, the multi-merchant portal determines that the Merchant 3 category 'Small Meals' maps to the system category 'Snacks,' which in turn maps to the Merchant 4 category 'Light Meals'. Thus, in response to the user's request to switch to the Merchant 4 e-commerce store, the multi-merchant portal switches the user's access to the Merchant 4 category 'Light Meals' 644, as shown in the GUI screen 600B.

The Merchant 3 category 632 and the Merchant 4 category 642 have different designations, i.e., 'Small Meals' and 'Light Meals' respectively. However, by using the system categories as a pivot, the appropriate match is determined. Once the user's access is switched to the Merchant 4 e-commerce store, the user is able to select products 644 available for purchase in the 'Light Meals' category by adding them to the shopping cart, select to browse another Merchant 4 category, or request to switch to another e-commerce store.

Figure 7:
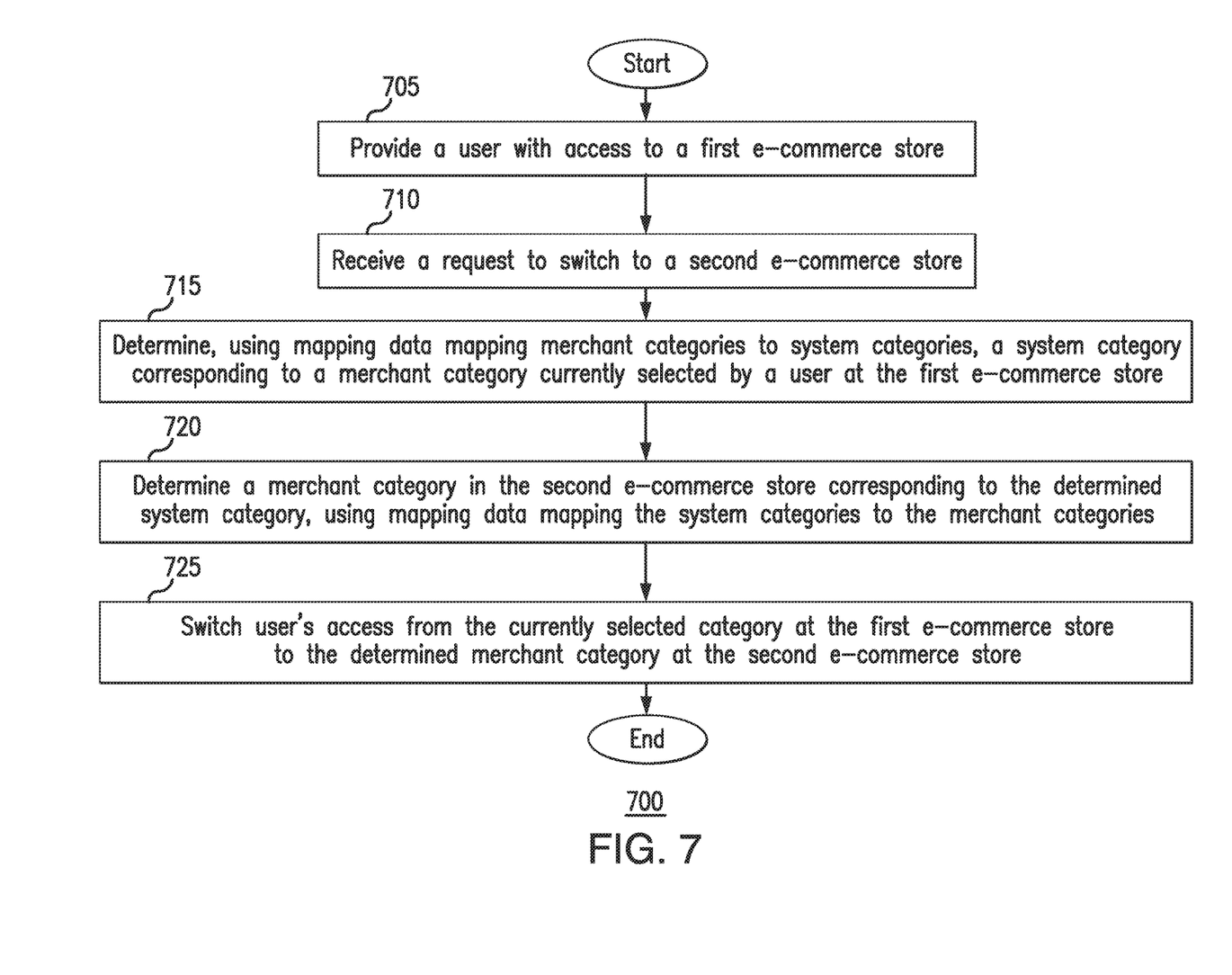
FIG. 7 is a flow diagram of a method for running a multi-merchant portal, in accordance with some embodiments of the present invention.

FIG. 7 is a flow diagram of a method 700 for running a multi-merchant portal by a server, in accordance with some embodiments of the present invention. The multi-merchant portal hosts a plurality of e-commerce stores respectively associated with a plurality of merchants and enables its users to browse and shop at such e-commerce stores using their customer devices.

Each e-commerce store has a plurality of merchant categories of the respective merchant defining a categorisation scheme for that e-commerce store. The merchant categories include one or more products available for purchase from the respective merchant and browsable by the user through the multi-merchant portal.

The multi-merchant portal has a plurality of system categories defining a categorisation scheme for the multi-merchant portal, merchant-to-system mapping data mapping the merchant categories of the plurality of merchants to the plurality of system categories, and system-to-merchant mapping data mapping the plurality of system categories to the merchant categories, such as discussed with reference to FIGS. 1 to 4.

The method 700 starts with step 705 at which the user is provided with access to a first e-commerce store at his or her customer device through the multi-merchant portal. For example, the user selects an e-commerce store (referred for convenience as the first e-commerce store) of a particular merchant from a home page of the multi-merchant portal identifying all available e-commerce stores. Once in the first e-commerce store, the user is able to browse at the customer device that store's merchant categories and products, select products for purchase, complete the purchase, or request to switch to another e-commerce store hosted by the multi-merchant portal.

At step 710, the multi-merchant portal receives a request from the customer device to switch access of the user to another e-commerce store (referred for convenience as the second e-commerce store). Such a request is generated by the customer device, for example, in response to the user clicking a tab in the GUI of the multi-merchant portal corresponding to the merchant associated with the second e-commerce store.

At step 715, the multi-merchant portal determines, using the merchant-to-system mapping data, a system category corresponding to the merchant category currently selected by the user in the first e-commerce store (the category that the user is accessing at the time he or she requests to switch to the second e-commerce store), for example, in the manner discussed with reference to FIGS. 2 to 4.

At step 720, the multi-merchant portal determine a merchant category at the second e-commerce store corresponding to the determined system category using the system-to-merchant mapping data, for example, in the manner discussed with reference to FIGS. 2 to 4.

As discussed above, when the mapping data is implemented as two relational tables, steps 715 and 720 can be executed as single step of running a single join query on the relational tables.

Once the merchant category at the second e-commerce store is determined, the multi-merchant portal switches the user's access at step 725 from the currently selected category at the first e-commerce store to the determined merchant category at the second e-commerce store. In this manner, the user is transported at the customer device from the merchant category selected by the user in the first e-commerce store at the time a request to switch to another e-commerce store is submitted to an equivalent or similar merchant category in the second e-commerce store, without having to apply any effort other than indicating that a switch is desired. Therefore, the described method makes it easier for the user to navigate the plurality of e-commerce stores at the customer device through the multi-merchant portal supported by a server (a combination of servers), such as described with reference to FIG. 1.

In some embodiments, the multi-merchant portal is implemented as a hosted service run by the server(s) in accordance with a dedicated or shared-service model. Customer devices access the service provided by the multi-merchant portal through a network connection such as via Wi-Fi or dedicated access to the Internet. This hosted service may be a dedicated service or be integrated into other hosted services provided to merchants and/or users.

In some embodiments, the multi-merchant portal is implemented using server(s) which form a part of or are in association with a payment network, for example as an add-on service provided by the payment network. Such implementation enables the multi-merchant portal to send a conventional authorisation request to initiate a payment transaction to complete purchase of products selected by the user an e-commerce store hosted by the multi-merchant portal with the corresponding merchant.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

For example, the customer device may take a form of a mobile device in communication with a smart appliance, such as a smart refrigerator, or the smart appliance itself. The hosted service then is facilitated by the mobile device or smart appliance and calls out from the mobile device/smart appliance and communicates with the server(s) hosting the multi-merchant portal to enable the functionalities described herein.

The order of execution or performance of the operations in the embodiments illustrated and described herein is not essential, unless otherwise specified. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

While the invention has been described in terms of various specific embodiments, the skilled person would recognize that the invention can be practiced with modification within the spirit and scope of the claims.

The invention claimed is:

1. A computer-implemented method of running by a server a multi-merchant portal enabling a user to shop at a plurality of e-commerce stores respectively associated with a plurality of merchants, using a customer device, the method comprising:
receiving by the server a request from the customer device to switch access of the user accessing a selected merchant category in a first of the plurality of e-commerce stores to a second of the plurality of e-commerce stores, wherein:
the first e-commerce store comprises a plurality of merchant categories of a first merchant including one or more products available for purchase from the first merchant and browsable by the user at the customer device through the multi-merchant portal, and
the second e-commerce store comprises a plurality of merchant categories of a second merchant including one or more products available for purchase from the second merchant and browsable by the user at the customer device through the multi-merchant portal;
determining by the server a system category corresponding to the selected merchant category of the first merchant using merchant-to-system mapping data mapping merchant categories of the plurality of merchants to a plurality of system categories of the multi-merchant portal;
automatically determining by the server, based at least in part on the system category corresponding to the selected merchant category of the first merchant, a destination of the plurality of merchant categories of the second merchant using system-to-merchant mapping data mapping the plurality of system categories to the merchant categories; and
automatically switching by the server access of the user at the multi-merchant portal from the selected merchant category in the first e-commerce store to the destination merchant category in the second e-commerce store in response to the request from the customer device to switch to the second e-commerce store, wherein
the merchant-to-system mapping data is a first two-dimensional relational table and the system-to-merchant mapping data is a second two-dimensional relational table,
the first two-dimensional relational table comprises a number of rows equal to a sum of merchant categories across the plurality of merchants, none of the number of rows of the first two-dimensional relational table including a null value,
the second two-dimensional relational table comprises a number of rows equal to a number of the plurality of system categories, none of the number of rows of the second two-dimensional relational table including a null value, the steps of determining the system category corresponding to the selected merchant category of the first merchant and determining the destination merchant category of the second merchant are performed by executing a single join query on the first and second two-dimensional relational tables.

2. The computer-implemented method of claim 1, wherein the selected merchant category of the first merchant and the destination merchant category of the second merchant have different designations.

3. The computer-implemented method of claim 1, wherein for each of the plurality of merchants, the merchant-to-system mapping data maps each merchant category of the merchant to one of the plurality of system categories of the multi-merchant portal; and the system-to-merchant mapping data maps each of the plurality of system categories of the multi-merchant portal to a single merchant category of the merchant.

4. The computer-implemented method of claim 3, wherein at least one of the plurality of merchants has two or more merchant categories mapped by the merchant-to-system mapping data to a same system category of the multi-merchant portal, thereby the merchant-to-system mapping data and system-to-merchant mapping data defining an asymmetrical relation between the two or more merchant categories of the at least one merchant and the same system category.

5. The computer-implemented method of claim 4, wherein the system category of the multi-merchant portal corresponding to the selected merchant category of the first merchant has a higher hierarchy level in the plurality of system categories than the selected merchant category in the plurality of merchant categories in the first merchant.

6. The computer-implemented method of claim 5, wherein the destination merchant category of the second merchant has a higher hierarchy level in the plurality of merchant categories of the second merchant than the system category of the multi-merchant portal corresponding to the selected merchant category of the first merchant in the plurality of system categories.

7. The computer-implemented method of claim 1, further comprising:

receiving by the server a request from the customer device to switch access of the user accessing a selected merchant category in the second e-commerce store to a third of the plurality of e-commerce stores, wherein the third e-commerce store comprises a plurality of merchant categories of a third merchant including one or more products available for purchase from the third merchant and browsable by the user at the customer device through the multi-merchant portal;

determining by the server a system category corresponding to the selected merchant category of the second merchant using the merchant-to-system mapping data;

determining by the server a destination of the plurality of merchant categories of the third merchant using the system-to-merchant mapping data; and switching by the server access of the user at the multi-merchant portal from the selected merchant category in the second e-commerce store to the destination merchant category in the third e-commerce store in response to the request from the customer device to switch to the third e-commerce store.

8. The computer-implemented method of claim 7, wherein the third e-commerce store is the first e-commerce store.

9. The computer-implemented method of claim 8, wherein the destination merchant category of the third merchant is different from the selected merchant category of the first merchant.

10. The computer-implemented method of claim 1, further comprising:

receiving through the multi-merchant portal data concerning one or more products selected by the user at the customer device for purchase at one of the plurality of e-commerce stores; and initiating by the server a payment transaction to complete the purchase of the selected one or more products.

11. The computer-implemented method of claim 1, wherein the multi-merchant portal is a web portal.

12. The computer-implemented method of claim 1, wherein the customer device is comprised in one of a smart refrigerator or a mobile device.

13. The computer-implemented method of claim 1,
wherein the selected merchant category of the first merchant and the destination merchant category of the second merchant have different designations,
wherein for each of the plurality of merchants,
the merchant-to-system mapping data maps each merchant category of the merchant to one of the plurality of system categories of the multi-merchant portal; and
the system-to-merchant mapping data maps each of the plurality of system categories of the multi-merchant portal to a single merchant category of the merchant.

14. The computer-implemented method of claim 1,
wherein the system category of the multi-merchant portal corresponding to the selected merchant category of the first merchant has a higher hierarchy level in the plurality of system categories than the selected merchant category in the plurality of merchant categories in the first merchant.

15. The computer-implemented method of claim 1,
wherein the destination merchant category of the second merchant has a higher hierarchy level in the plurality of merchant categories of the second merchant than the system category of the multi-merchant portal corresponding to the selected merchant category of the first merchant in the plurality of system categories.

* * * * *